(12) United States Patent
Mericas

(10) Patent No.: US 7,225,105 B2
(45) Date of Patent: May 29, 2007

(54) EXTENDING WIDTH OF PERFORMANCE MONITOR COUNTERS

(75) Inventor: Alexander E. Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/733,443

(22) Filed: Dec. 10, 2003

(65) Prior Publication Data

US 2004/0122622 A1 Jun. 24, 2004

Related U.S. Application Data

(62) Division of application No. 09/931,308, filed on Aug. 16, 2001.

(51) Int. Cl.
*G06F 17/00* (2006.01)

(52) U.S. Cl. .......................... 702/182; 702/79; 702/80; 702/176; 702/178; 702/186; 714/47

(58) Field of Classification Search .................. 702/57, 702/79–81, 176, 179, 182, 186, 188, 189; 714/39, 47
See application file for complete search history.

(56) References Cited

U.S. PATENT DOCUMENTS

| 3,564,212 | A | * | 2/1971 | North | 235/456 |
| 5,257,358 | A | * | 10/1993 | Cohen | 714/38 |
| 5,557,548 | A | * | 9/1996 | Gover et al. | 702/176 |
| 5,835,702 | A | * | 11/1998 | Levine et al. | 714/39 |
| 6,233,531 | B1 | * | 5/2001 | Klassen et al. | 702/80 |
| 2002/0026524 | A1 | * | 2/2002 | Dharap | 709/236 |

* cited by examiner

*Primary Examiner*—Jeffrey R. West
(74) *Attorney, Agent, or Firm*—Mark Walker, Esq.; Synnestvedt & Lechner LLP

(57) ABSTRACT

A performance monitor includes at least one Monitor Mode Control Register (MMCR) and plural Performance Control Monitors (PMCs). Each PMC is controlled by the MMCR to pair or group the PMCs so that the overflow from one PMC can be directed to its pair/group. By coupling the PMCs so that overflow from one can be directed to another, the effective size of the counters can be increased.

4 Claims, 4 Drawing Sheets

EXTENDING WIDTH OF PERFORMANCE MONITOR COUNTERS

CROSS-REFERENCE TO RELATED APPLICATIONS

This application is a divisional of U.S. application Ser. No. 09/931,308, filed Aug. 16, 2001.

BACKGROUND OF THE INVENTION

1. Field of the Invention

The present invention relates in general to a data processing system and, in particular, to a method and system for performance monitoring within a data processing system. Still more particularly, the present invention relates to a method and system for extending the width of performance monitoring counters in a processor.

2. Description of the Related Art

Within a state-of-the-art general purpose microprocessor facilities are often provided that enable the processor to count occurrences of selected events and thereby obtain a quantitative description of the operation of a data processing system. These facilities are generally referred to as performance monitors.

A conventional performance monitor includes at least one control element, such as a monitor mode control register (MMCR), and one or more counting elements, such as performance monitor counters (PMC's). The MMCR is typically comprised of a plurality of bit fields, which are set to specified values in order to select the events to be monitored and to specify the conditions under which the PMC's are enabled. Occurrences of the selected events can then be counted by the PMC's.

Because both the number of events available for monitoring and the number of occurrences of monitored events may be large, it would be preferable for performance monitors to employ a large width MMCR and large width PMC's. In addition, because each PMC typically records occurrences of only a single specified event at any given time, it would be preferable to have a large number of PMC's in order to be able to provide a broad description of data processing system performance. However, because the added functionality provided by a large MMCR and multiple large PMC's increases a processor's die size and therefore cost, the size and number of MMCR's and PMC's are generally somewhat restricted due to these economic and size considerations, and are typically 32 or 64 bits wide at their maximum.

After counting 32 bits, a 32-bit wide PMC is considered full. If a full PMC is allowed to continue counting, the PMC reverts to 0 and begins counting again. This process is known as "wrapping" and the PMC is described as "wrapping to 0." Wrapping has the potential to lose data since any software configured to read the PMC (to allow evaluation of the state of the PMC) would not be able to determine if the PMC had wrapped or had simply not reached its capacity yet. To deal with this problem, prior art systems employ "interrupt handlers". An interrupt handler is software written to handle conditions that cause interrupts and exceptions. Interrupt handlers can detect which PMC(s) cause an exception and then can maintain a "virtual" counter that records the overflow history. These interrupt handlers sense the transition of the left-most bit of a PMC from 0 to 1, which provides an indication that the PMC is almost full. The interrupt handler clears the data in the PMC by moving it to an accumulator, which is simply a software version of the PMC that can be arbitrarily large. Thus, the PMC's accumulate the data, dump the data to the software accumulator when full, and continue counting.

While this system functions sufficiently when the processor is fully operational (i.e., when the processor is running software that is capable of handling interrupts), during initial hardware testing of the processor, when the software is unavailable to perform the accumulation function, there is nowhere to move the stored data from a full PMC.

Accordingly, it would be desirable to have a hardware solution for increasing the available width of PMC's during the initial hardware testing of the processor or when the processor is executing time-sensitive code that cannot be interrupted.

SUMMARY OF THE INVENTION

The above as well as additional objects, features, and advantages of the present invention will become apparent in the following detailed written description. In accordance with the present invention, in a performance monitor having plural performance monitor counters (PMC's) and at least one monitor mode control register (MMCR), each PMC is controlled by the MMCR to pair or group the PMCs so that the overflow from one PMC can be directed to its pair/group. By coupling the PMCs so that overflow from one can be directed to another, the effective size of the counters can be increased.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
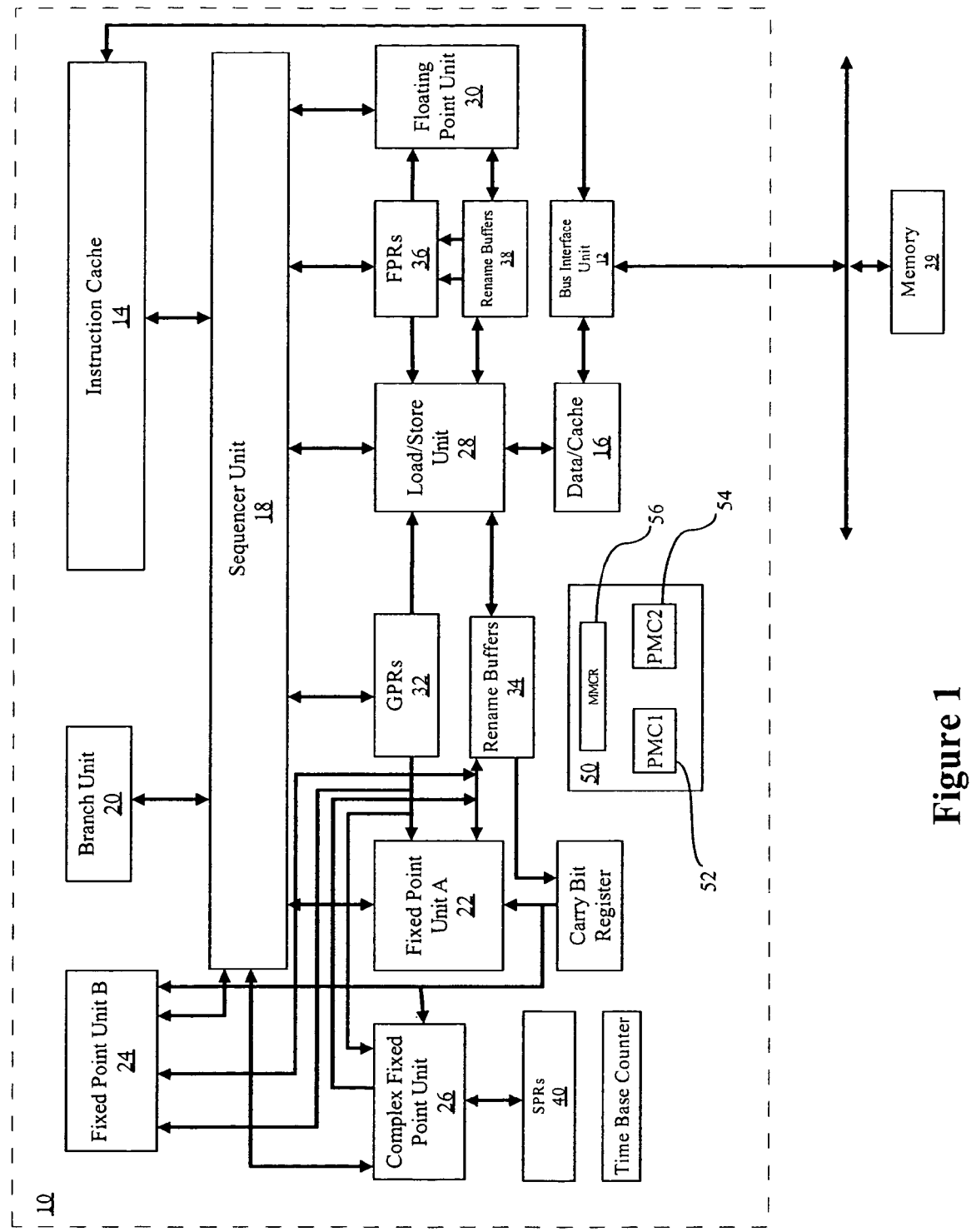
FIG. 1 is a block diagram illustrating a typical processor environment in which a performance monitor monitors the operation of the processor.

With reference now to the figures and in particular with reference to FIG. 1, there is depicted a block diagram of an illustrative embodiment of a typical processor environment, indicated generally at 10, in which the invention recited within the appended claims can be utilized. In the depicted illustrative example, processor 10 comprises a single integrated circuit superscalar microprocessor. An example of processor 10 is the PowerPC™ line of microprocessors available from IBM Microelectronics; however, those skilled in the art will appreciate from the following description that the present invention could alternatively be incorporated within other suitable processors.

Processor 10 includes various execution units 20, 22, 24, 26, 28, and 30; registers 32, 36, and 40; buffers 34 and 38;

memories 14, 16, and 39; and other functional units (e.g., bus interface unit 12 and sequencer unit 18), all of which are formed from integrated circuitry. For a detailed description of the configuration and operation of such a processor reference can be made to U.S. Pat. No. 5,991,708 to Levine et al. (and with specific reference to FIG. 1 thereof, the description of which is incorporated herein by reference). Of specific interest relevant to the present invention, however, is performance monitor 50 of FIG. 1.

Performance monitor 50 is a software-accessible mechanism capable of providing detailed information descriptive of the utilization of instruction execution resources and storage control. Although not illustrated in FIG. 1, performance monitor 50 is coupled to each functional unit of processor 10 in order to permit the monitoring of all aspects of the operation of processor 10 including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, and determining performance efficiency. Performance monitor 50 includes an implementation-dependent number (e.g., 2–8) of PMC's. In FIG. 1, two PMC's 52 and 54, labelled PMC1 and PMC2, are shown which are utilized to count occurrences of selected events. Performance monitor 50 further includes at least one MMCR 56 that specifies the function of PMC's 52–54. PMC's 52–54 and MMCR 56 are preferably implemented as special purpose registers (SPRs) that are accessible for read or write via MFSPR (move from SPR) and MTSPR (move to SPR) instructions executable by CFXU 26. However, PMC's 52–54 and MMCR 56 may instead be implemented simply as addresses in I/O space.

Figure 2:
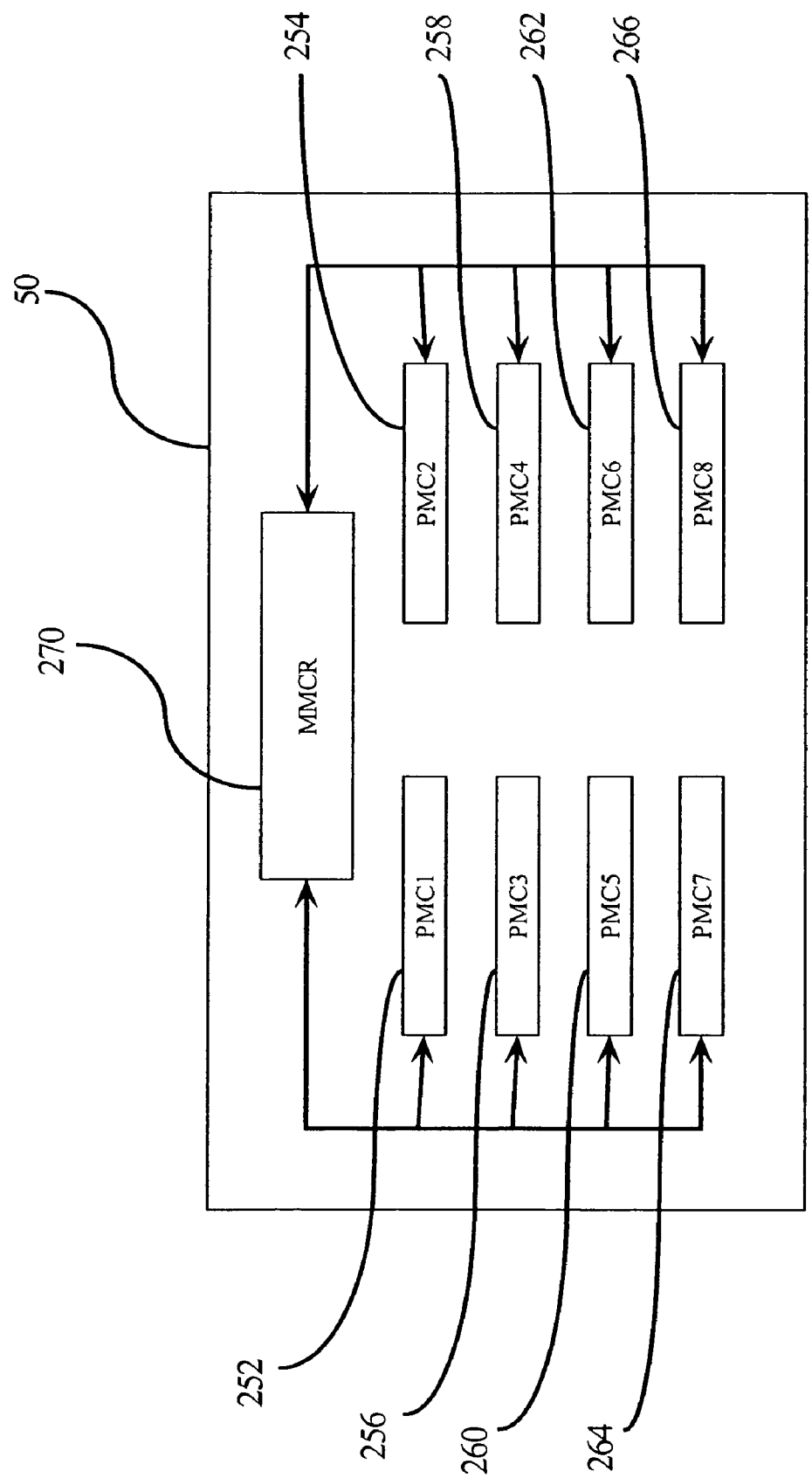
FIG. 2 illustrates a performance monitor having eight performance monitor counters.

FIG. 2 illustrates a configuration for performance monitor 50 which can be used to perform the novel allocation process in accordance with the present invention. For the purposes of explanation, performance monitor 50 illustrated in FIG. 2 includes eight PMC's 252, 254, 256, 258, 260, 262, 264, and 266, labeled PMC1, PMC2, PMC3, PMC4, PMC5, PMC6, PMC7, and PMC8, respectively. It should be understood, however, that performance monitor 50 could include more or less than eight PMC's.

Referring to FIG. 2, each of the PMC's 252–266 are coupled to MMCR 270 to control the operation of the PMC's. In addition, performance monitor 50 is coupled to each functional unit of the processor 10 of FIG. 1 to permit monitoring of all aspects of the operation of the processor. In accordance with the present invention, the MMCR is configured to "pair off" or group sets of the PMC's so that overflow from the first PMC of the pair/group can be counted by other PMC's of the pair/group. For example, if it is assumed that MMCR 270 groups the PMC's in pairs, when MMCR 270 senses the transition of the left-most bit of PMC 252 from a 0 to a 1, MMCR 270 might automatically direct additional counts, previously being counted by PMC 252, to be counted by PMC 254, without interruption. This essentially doubles the size of the counters available for counting events being counted by PMC 252. Each of the remaining PMC's can be similarly paired (e.g., PMC 256 paired with PMC 258; PMC 260 paired with PMC 262; and PMC 264 paired with PMC 266). If each PMC is 32 bits wide, this pairing enables four events to be monitored by the equivalent of one 64-bit counter per event. Further, since the control of the overflow is performed by MMCR 270, the available space can be maximized to suit the needs of the system. The actual pairing off or grouping of the PMC's is performed through programming MMCR 270 using known programming techniques to coordinate the counting by the designated pairs.

Figure 3:
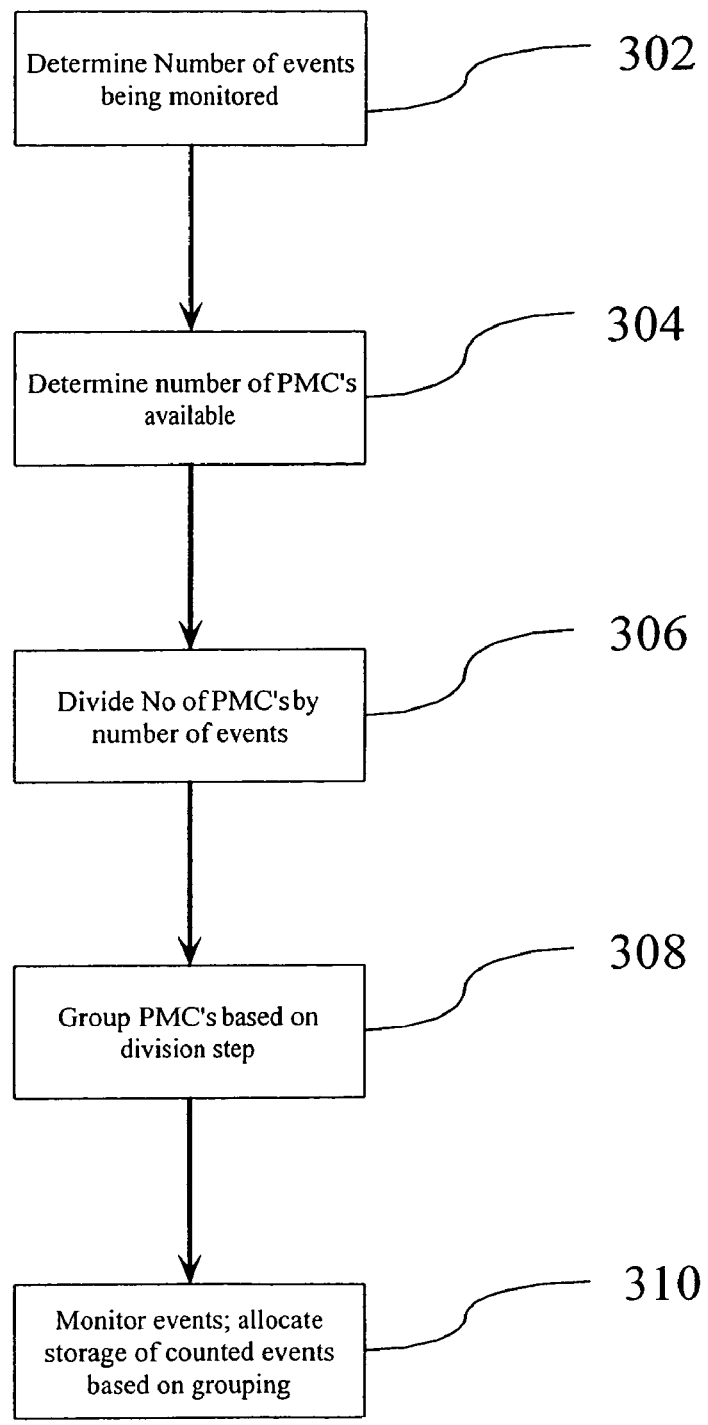
FIG. 3 is a flowchart illustrating an example of steps performed to allocate PMC's in accordance with a first embodiment of the present invention.

FIG. 3 is a flowchart illustrating an example of steps performed to allocate PMC's in accordance with a first embodiment of the invention in which the PMC's are divided evenly among the events being monitored. When the number of PMC's and number of events being monitored cannot be divided evenly, one or more of the PMC's will have less than others. Referring to FIG. 3, at step 302, the number of events being monitored is determined. At step 304, the number of PMC's available for monitoring is determined, and at step 306, the number of PMC's available is divided by the number of events to determine the grouping of the PMC's (step 308). Finally, at step 310, all of the events are monitored on a continuous basis, and allocation of the storage of the counted events is conducted based upon the grouping of the PMC's as done in step 308. All of these actions are carried out based on control from the MMCR. If, as an example, it is assumed that there are two events that need to be monitored, then, using the performance monitor 50 illustrated in FIG. 2, four PMC's could be grouped per event (or any combination could be utilized to monitor the events, depending upon need, as discussed below). Indeed, if only a single event was being monitored, all eight PMC's of the performance monitor 50 of FIG. 2 could be utilized, thereby giving the tester the equivalent of a single counter that is eight times the size of a single counter.

Figure 4:
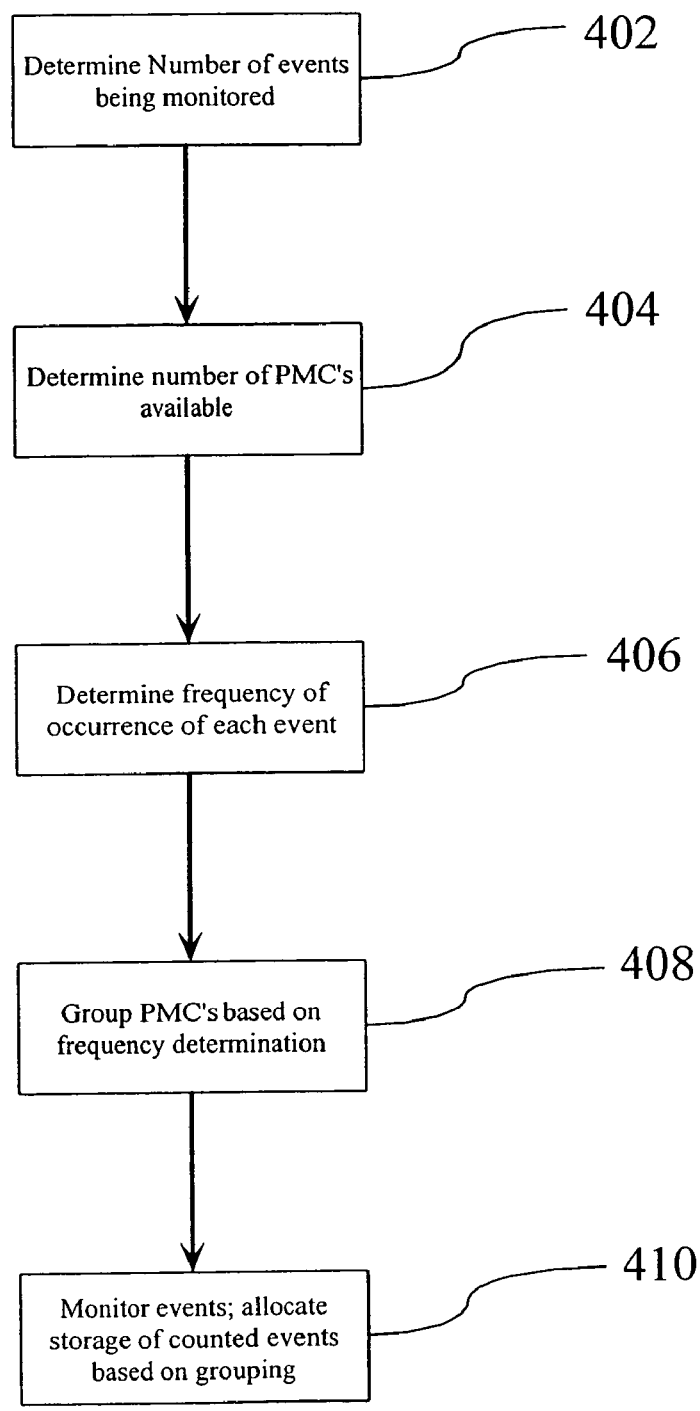
FIG. 4 is a flowchart illustrating an example of steps performed to allocate PMC's in accordance with a second embodiment of the present invention.

As an alternative, the MMCR may be configured to determine, ahead of time, not only the number of events being counted, but also the potential frequency of counts for each event. This can be based on historical statistical information made available for use by the MMCR from a memory, or can be preset based on information manually input by a programmer. In this way, if one particular event occurs frequently while another event occurs infrequently, the MMCR can assign more PMC's to the first event and less to the second event. FIG. 4 is a flowchart illustrating an example of the steps to be performed in order to group the PMC's in accordance with this alternate method. Referring to FIG. 4, at step 402, the number of events being monitored by the PMC is determined, and at step 404, the number of PMC's available for doing the monitoring is determined. At step 406, the frequency of occurrence of each event being monitored is identified and, at step 408, based upon this determination, the PMC's are grouped so as to take advantage of the statistical data regarding frequency. Thus, events that occur more frequently will have more PMC's allocated to them, and events that occur less frequently will have less PMC's allocated. Finally, at step 410, the events are monitored and the storage of the counted events is allocated based upon the grouping. Thus, for example, an event A, which is identified as being a frequently-occurring event, may be assigned six counters in an initialization stage, while event B, which is identified as happening very rarely, may be assigned only two counters during the initialization phase.

The techniques and methods for embodying the present invention in software program code to control the performance monitor are well-known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A performance monitor for monitoring an occurrence of incidences of one or more events related to operation of a processor, comprising:
   at least one monitor mode control register; and
   a plurality of performance monitor counters operatively connected to said at least one monitor mode control register to count incidences of said one or more events, said at least one monitor mode control register grouping said performance monitor counters so that when one of said performance monitor counters reaches capacity in connection with the counting incidences of a first of said one or more events, a second of said performance monitor counters begins counting subsequent incidences of said first of said one or more events;
   wherein the number of events equals X, and the number of performance monitor counters equals Y, whereby said at least one monitor mode control register groups said performance monitor counters into Z groups, wherein $Y/X=Z$; and
   wherein when $X<Y$, said at least one monitor mode control register assigns a number of performance monitor counters, said number of performance monitor counters equal to an integer resulting from dividing Y by X, to each of said events to be counted; and
   wherein said at least one monitor control register assigns any unassigned performance monitor counters to at least one of said events.

2. A performance monitor for monitoring an occurrence of incidences of one or more events related to operation of a processor, comprising:
   at least one control element; and
   a plurality of counting elements operatively coupled to said at least one control element to count incidences of said one or more events, said at least one control element grouping said plurality of counting elements so that when one of said plurality of counting elements reaches capacity in connection with the counting of incidences of a first of said one or more events, a second of said plurality of counting elements begins counting subsequent incidences of said first of said one or more events;
   wherein the number of events equals X, and the number of counting elements equals Y, whereby said at least one control element groups said counting elements into Z groups, wherein $Y/X=Z$; and
   wherein when $X<Y$, said at least one control element assigns a number of counting elements, said number of counting elements equal to an integer resulting from dividing Y by X, to each of said events to be counted; and
   wherein said at least one control element assigns any unassigned counting elements to at least one of said events.

3. The performance monitor as set forth in claim 2, wherein said at least one control element comprises a monitor mode control register.

4. The performance monitor as set forth in claim 3, wherein each of said plurality of counting elements comprises a performance monitor counter operatively connected to said monitor mode control register.

* * * * *